US010282155B2

(12) United States Patent
Alberth, Jr. et al.

(10) Patent No.: US 10,282,155 B2
(45) Date of Patent: *May 7, 2019

(54) PORTABLE ELECTRONIC DEVICE AND METHOD FOR CONTROLLING OPERATION THEREOF TAKING INTO ACCOUNT WHICH LIMB POSSESSES THE ELECTRONIC DEVICE

(71) Applicant: Google Technology Holdings LLC, Mountain View, CA (US)

(72) Inventors: William P Alberth, Jr., Prairie Grove, IL (US); Rachid Mohsen Alameh, Crystal Lake, IL (US); Timothy A. Dickinson, Crystal Lake, IL (US); Robert A. Zurek, Antioch, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 46 days.

This patent is subject to a terminal disclaimer.

(21) Appl. No.: 15/156,247

(22) Filed: May 16, 2016

(65) Prior Publication Data
US 2016/0259610 A1    Sep. 8, 2016

Related U.S. Application Data

(63) Continuation of application No. 13/358,951, filed on Jan. 26, 2012, now Pat. No. 9,367,085.

(51) Int. Cl.
*G06F 17/00* (2006.01)
*G06F 3/14* (2006.01)
(Continued)

(52) U.S. Cl.
CPC ............... *G06F 3/14* (2013.01); *G06F 1/163* (2013.01); *G06F 3/005* (2013.01); *G06F 3/011* (2013.01);
(Continued)

(58) Field of Classification Search
CPC . G06F 3/14; G06F 1/163; G06F 3/005; G06F 3/011; G06F 3/017; G06F 3/16; G06F 2200/1637
See application file for complete search history.

(56) References Cited

U.S. PATENT DOCUMENTS

H000716 H    12/1989    McDonald et al.
6,491,630 B1    12/2002    Saccardo et al.
(Continued)

FOREIGN PATENT DOCUMENTS

CN    101266516 A    9/2008
CN    101916161 A    12/2010
(Continued)

OTHER PUBLICATIONS

"Stock XOOM Browser Quick Controls", retrieved from xoomforums. com, 2011, 6 pp.
(Continued)

*Primary Examiner* — Fan S Tsang
*Assistant Examiner* — David Siegel
(74) *Attorney, Agent, or Firm* — Shumaker & Sieffert, P.A.

(57) ABSTRACT

A portable electronic device includes a processor and a detection mechanism operable to detect one or more characteristics relating to how a user handles the electronic device. The processor is operably coupled to the detection mechanism and operable in accordance with stored operating instructions to: determine, based on the detected characteristics, which limb of the user possesses the portable electronic device; and control at least one function of the portable electronic device taking into account which limb of the user possesses the electronic device (e.g., which limb of the user is holding or secured to the electronic device). According to one embodiment, the processor may further
(Continued)

determine a reference position for the portable electronic device (e.g., a position of the device at rest) and compare one or more of the detected characteristics to the reference position to determine which limb of the user possesses the electronic device.

14 Claims, 7 Drawing Sheets

(51) Int. Cl.
    *G06F 3/01*         (2006.01)
    *G06F 3/0346*     (2013.01)
    *G06F 1/16*         (2006.01)
    *G06F 3/00*         (2006.01)
    *G06F 3/16*         (2006.01)

(52) U.S. Cl.
    CPC ............ *G06F 3/017* (2013.01); *G06F 3/0346* (2013.01); *G06F 3/16* (2013.01); *G06F 2200/1637* (2013.01)

(56) References Cited

U.S. PATENT DOCUMENTS

| | | |
|---|---|---|
| 6,538,636 B1 | 3/2003 | Harrison |
| 7,068,256 B1 | 6/2006 | Gettemy et al. |
| 7,218,313 B2 | 5/2007 | Marcus et al. |
| 7,653,883 B2 | 1/2010 | Hotelling et al. |
| 7,800,592 B2 | 9/2010 | Kerr et al. |
| 8,098,233 B2 | 1/2012 | Hotelling et al. |
| 8,103,263 B2 | 1/2012 | Shim et al. |
| 8,390,481 B2 | 3/2013 | Pance et al. |
| 8,413,067 B2 | 4/2013 | Cohen et al. |
| 8,504,934 B1 | 8/2013 | Yu et al. |
| 8,719,719 B2 | 5/2014 | Cohen et al. |
| 8,850,349 B2 | 9/2014 | Zhang et al. |
| 9,013,397 B2 | 4/2015 | Hiramoto |
| 9,215,302 B2 | 12/2015 | Thorson et al. |
| 9,367,085 B2 | 6/2016 | Alberth et al. |
| 2002/0021278 A1 | 2/2002 | Hinckley et al. |
| 2002/0107055 A1 | 8/2002 | Yamazaki et al. |
| 2003/0234768 A1 | 12/2003 | Rekimoto et al. |
| 2004/0036680 A1 | 2/2004 | Davis et al. |
| 2004/0178994 A1 | 9/2004 | Kairis, Jr. |
| 2004/0183834 A1 | 9/2004 | Chermesino |
| 2005/0154798 A1 | 7/2005 | Nurmi |
| 2005/0159850 A1 | 7/2005 | Melman |
| 2006/0026535 A1 | 2/2006 | Hotelling et al. |
| 2006/0038774 A1 | 2/2006 | Mese et al. |
| 2006/0192724 A1 | 8/2006 | Kezys et al. |
| 2006/0197750 A1 | 9/2006 | Kerr et al. |
| 2006/0197753 A1 | 9/2006 | Hotelling |
| 2007/0010211 A1 | 1/2007 | Mixon |
| 2007/0236460 A1 | 10/2007 | Young et al. |
| 2007/0291831 A1 | 12/2007 | Lee |
| 2009/0069045 A1 | 3/2009 | Cheng |
| 2009/0143106 A1 | 6/2009 | Meitzler et al. |
| 2009/0160792 A1 | 6/2009 | Morohoshi et al. |
| 2009/0259969 A1 | 10/2009 | Pallakoff |
| 2009/0303200 A1 | 12/2009 | Grad |
| 2010/0013651 A1* | 1/2010 | Spalink ................ G06F 3/0338 340/669 |
| 2010/0013780 A1 | 1/2010 | Ikeda et al. |
| 2010/0045705 A1 | 2/2010 | Vertegaal et al. |
| 2010/0097331 A1 | 4/2010 | Wu |
| 2010/0103098 A1 | 4/2010 | Gear et al. |
| 2010/0120466 A1 | 5/2010 | Li |
| 2010/0123675 A1 | 5/2010 | Ippel |
| 2010/0134423 A1 | 6/2010 | Brisebois et al. |
| 2010/0146444 A1 | 6/2010 | Wang et al. |
| 2010/0153313 A1 | 6/2010 | Baldwin et al. |
| 2010/0214267 A1 | 8/2010 | Radivojevic et al. |
| 2010/0315266 A1 | 12/2010 | Gunawardana et al. |
| 2010/0315348 A1 | 12/2010 | Jellicoe |
| 2011/0065392 A1 | 3/2011 | Chung |
| 2011/0141120 A1 | 6/2011 | Platzer et al. |
| 2011/0197158 A1 | 8/2011 | Tseng et al. |
| 2011/0234487 A1 | 9/2011 | Hiramoto |
| 2011/0242138 A1 | 10/2011 | Tribble |
| 2011/0314429 A1 | 12/2011 | Blumenberg |
| 2012/0026110 A1 | 2/2012 | Yamano |
| 2012/0062387 A1 | 3/2012 | Vik et al. |
| 2012/0071203 A1 | 3/2012 | Wong et al. |
| 2012/0075249 A1 | 3/2012 | Hoch |
| 2012/0113007 A1 | 5/2012 | Koch et al. |
| 2012/0117506 A1 | 5/2012 | Koch et al. |
| 2012/0138441 A1 | 6/2012 | Kim et al. |
| 2012/0188174 A1 | 7/2012 | Migos et al. |
| 2012/0206556 A1 | 8/2012 | Yu et al. |
| 2012/0315954 A1 | 12/2012 | Ahn et al. |
| 2013/0021293 A1 | 1/2013 | Nakai |
| 2013/0034066 A1 | 2/2013 | Kakishima |
| 2013/0035139 A1* | 2/2013 | Sheynblat ............. G06F 1/1626 455/566 |
| 2013/0038564 A1 | 2/2013 | Ho |
| 2013/0093680 A1 | 4/2013 | Ogita |
| 2013/0196596 A1 | 8/2013 | Parekh et al. |
| 2013/0237272 A1 | 9/2013 | Prasad |
| 2013/0300668 A1 | 11/2013 | Churikov et al. |
| 2013/0307801 A1 | 11/2013 | Nam |
| 2013/0317921 A1 | 11/2013 | Havas |
| 2014/0032165 A1 | 1/2014 | Sarrafzadeh et al. |
| 2014/0068492 A1 | 3/2014 | Yu et al. |
| 2014/0078094 A1 | 3/2014 | Yang |
| 2014/0184171 A1 | 7/2014 | Lee et al. |
| 2014/0187204 A1 | 7/2014 | Hartman |
| 2014/0189551 A1 | 7/2014 | Kim et al. |
| 2014/0208128 A1 | 7/2014 | Gyorti et al. |
| 2015/0002350 A1 | 1/2015 | Vance |
| 2015/0236758 A1 | 8/2015 | Choi |
| 2016/0259610 A1 | 9/2016 | Alberth et al. |

FOREIGN PATENT DOCUMENTS

| | | |
|---|---|---|
| EP | 2360560 A1 | 8/2011 |
| EP | 2175344 A3 | 2/2012 |
| EP | 2515593 A2 | 10/2012 |
| JP | 2007179502 A | 7/2007 |
| WO | 2010071188 A1 | 6/2010 |

OTHER PUBLICATIONS

Sy, "Designing IR gesture-sensing systems," Jun. 9, 2011, online version of Electronics Design, Strategy, News at http://www.edn.com/article/518437 -Designing_IR_gesture_sensing_systems.php (4 pages).

Andol Li, "Hand gesture detection and recognition using openCV," retrieved from www.andol.info/hci/895.htm, Apr. 3, 2009, 8 pp.

Hinckley et al., "Sensing Techniques for Mobile Interaction," UIST 2000 Proceedings of the 13th annual ACM symposium on User interface software and technology, 2000, 10 pp.

Stevens, "EyeSight's hand-waving, gesture-based UI now available for Android (video)," AOL Inc., retrieved from http://www.engadget.com/2010/06/08/eyesights-hand-waving-gesture-based-ui-now-available-for-andro/, Jun. 8, 2010, 4 pp.

"Gesture recognition," Retrieved from http://en.wikipedia.org/wiki/Gesture_recognition, Jan. 26, 2012 , 7 pp.

Wimmer, et al. "HandSense—Discriminating Different Ways of Grasping and Holding a Tangible User Interface", TEI 2009, Feb. 16-18, 2009, 4 pgs.

Prosecution History from U.S. Pat. No. 9,367,085, dated Oct. 23, 2014 through Feb. 12, 2016, 111 pp.

* cited by examiner

PORTABLE ELECTRONIC DEVICE AND METHOD FOR CONTROLLING OPERATION THEREOF TAKING INTO ACCOUNT WHICH LIMB POSSESSES THE ELECTRONIC DEVICE

RELATED APPLICATION

This application is a continuation of U.S. patent application Ser. No. 13/358,951, filed Jan. 26, 2012, the entire content of which is being incorporated herein by reference.

FIELD OF THE INVENTION

The present invention relates generally to portable electronic devices and, more particularly, to a portable electronic device capable of controlling one or more of its functions taking into account which limb of a user possesses it.

BACKGROUND

Portable electronic devices are ubiquitous in today's society. Such devices include, for example, cell phones, smart phones, portable media players, tablet computers, personal digital assistants, handheld gaming devices, handheld global positioning satellite (GPS) units, cameras, and wearable heart rate monitors, just to name a few. A portable electronic device is generally configured such that visual or audible information output by the device is presented uniformly across a display screen or from output speakers under an assumption that, in most cases, the user will generally center the device in his or her field of view/hearing when using it. Additionally, the keys and buttons of portable electronic devices are typically configured with default functions, although some devices allow users to manually change button or key functions by proceeding through a series of operations available to the users through electronic menus. By maintaining a sense of neutrality with respect to content delivery and user interface access, portable electronic devices may be used by individuals regardless of whether the individuals are left-handed or right-handed. Any tailoring of the portable device to accommodate a user's dexterity must be performed manually by the user, assuming that the device even permits such adjustment.

The desire to tailor an electronic device to the dexterity of its user is more pronounced with respect to electronic devices that are securable to or wearable by a user, such as wristwatch phones, wearable heart rate monitors, and wearable portable media devices. Without device function adjustment, a user of a wearable device must move either the limb to which the device is secured or the user's head so as to permit the user to properly view the device's display screen, hear the device's speaker(s), and/or use the device's user interface. Depending upon how the electronic device is secured to the user's limb, substantial contortion of the user's limb and/or neck may be necessary to use the device properly. As a result, users may refrain from experiencing all the benefits of the electronic device.

Figure 1:
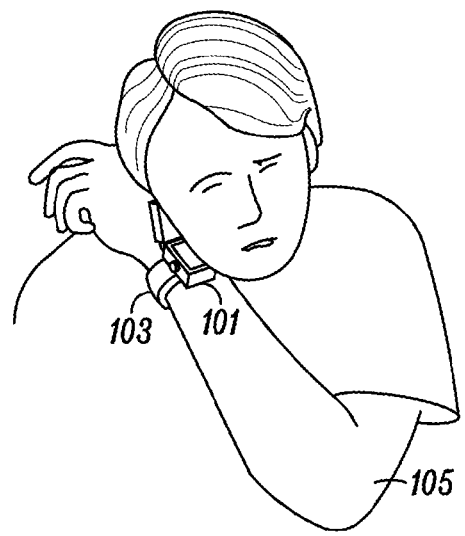
FIG. 1 illustrates an exemplary wearable electronic device as secured to an outside portion of a user's left wrist in accordance with one exemplary embodiment of the present invention.

Skilled artisans will appreciate that elements in the figures are illustrated for simplicity and clarity and have not necessarily been drawn to scale. For example, the dimensions of some of the elements in the figures may be exaggerated alone or relative to other elements to help improve the understanding of the various exemplary embodiments of the present invention.

DETAILED DESCRIPTION

Generally, the present invention encompasses a portable electronic device and a method for controlling one or more of the device's functions taking into account which limb of a user possesses the device. The portable electronic device may be any portable device that is sized and shaped to be possessed by (e.g., carried by or secured to) a user's limb. Portable electronic devices include, but are not limited to, cell phones, smart phones, portable media players, tablet computers, personal digital assistants, handheld gaming devices, cameras, camcorders, handheld GPS units, and wearable or handheld health monitoring devices. According to one embodiment, the portable electronic device includes a processor and a detection mechanism. The detection mechanism detects one or more characteristics relating to how a user handles the device. For example, the detection mechanism may detect a direction, angle, rotation, and/or orientation of movement of the device relative to a reference position prior to, during, and/or after use of the device, and/or may detect an environment surrounding the device prior to, during, and/or after its use. Therefore, the detection mechanism may include, for example, a camera, an accelerometer, a gyroscope, and/or a proximity detector (such as an optical sensor and/or an ultrasonic sensor). The user-handling characteristics may be detected over a period of time and stored in memory to provide historical information regarding the user's handling of the electronic device.

The processor operates in accordance with stored operating instructions to, inter alia, determine, based on the current and/or historical user-handling characteristics, which limb of the user possesses the device and control at least one function of the device taking into account which limb is in possession. For example, the processor may control a direction of audio outputted by the device (e.g., speaker steering), a direction from which audio is received by the device (e.g., microphone steering), arrangement of information and images displayed on a display of the device, user interface configuration for the device (e.g., button function assignment), and various other functions of the device taking into account which limb of the user possesses the device. The processor may be further operable to determine, based on the user-handling characteristics, a positioning of the electronic device on the limb of the user and control at least one function of the device taking into account the positioning of the device on the limb. In this case, the function control takes into account both the limb in possession of the device and the positioning of the device on the limb. For example, the processor may determine whether the device is on the inside or outside of a user's wrist and control one or more functions taking into account the determined positioning.

According to an alternative embodiment, the processor may be further operable to determine a reference position for the electronic device from which to compare one or more of the user-handling characteristics and determine which limb of the user possesses the electronic device based on a comparison of the user-handling characteristics to the reference position. For example, where the detection mechanism includes a compass, an accelerometer, and/or a gyroscope, the accuracy of the processor's determination of change of direction, angle, rotation, or other orientation of movement may be substantially improved by referencing the change to a reference position (e.g., a relative center of a three-dimensional space in which the electronic device may be moved). The reference position may be determined through use of a training sequence (e.g., walking the device user through a training sequence upon initial start-up of the device or activation of the limb detection feature) or as a result of either normal initial setup operations or general use of the electronic device. According to one exemplary embodiment in which the electronic device includes a display and a user interface, the processor may be operable to display textual messages and/or images on the display (e.g., oriented in what the processor believes is an upright manner) and determine a reference position for the electronic device based on inputs received via the user interface responsive to the displayed information. For example, where the electronic device is a cell phone and the cell phone receives a keypad entry of a phone number to commence a call, the cell phone's processor may determine that the cell phone's display is upright and in front of the user's head while the keypad is receiving the digit entries for the target phone number. The positioning of the cell phone during entry of the target number into the keypad may then be used as a reference position based upon which the cell phone's processor can gauge movement of the phone for purposes of determining which limb of the user possesses the phone.

Where the portable electronic device is a smart phone, cellular phone, tablet computer, cordless phone, portable media player, or other electronic device with short-range or wide area wireless communication capability, the portable electronic device may further include an audio output device and a transceiver for transmitting and receiving wireless communication signals that include audio information to be provided audibly to a user. In this case, the processor may process received wireless communication signals to extract the audio information and control the audio output device to output the extracted audio information toward an expected head location of the user taking into account which limb of the user possesses the portable device.

By automatically determining which limb of the user currently possesses the electronic device, the present invention provides a mechanism for the electronic device to adapt one or more of its functions to accommodate use of the device in view of which limb of the user is currently possessing the device. In this manner, the present invention provides a dexterity accommodation feature for the electronic device, thereby making the device easier to use for the user.

Figure 2:
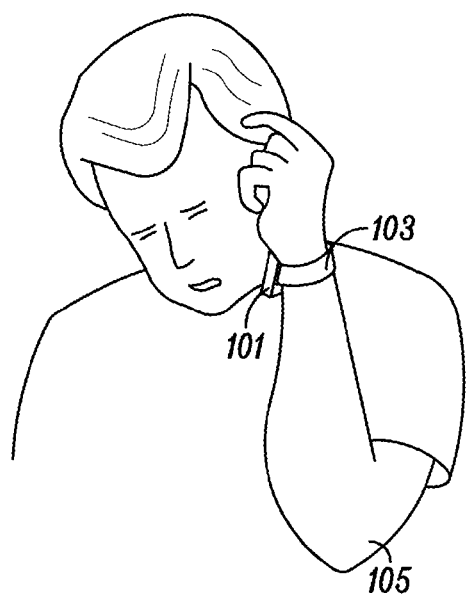
FIG. 2 illustrates an exemplary wearable electronic device as secured to an inside portion of a user's left wrist in accordance with another exemplary embodiment of the present invention.
Figure 3:
FIG. 3 illustrates an exemplary wearable electronic device as secured to an outside portion of a user's right wrist in accordance with a further exemplary embodiment of the present invention.
Figure 4:
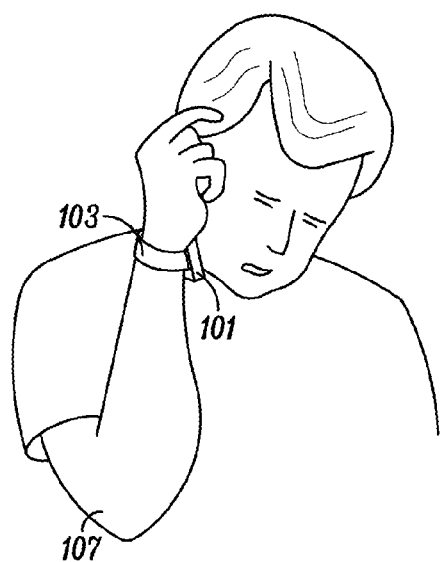
FIG. 4 illustrates an exemplary wearable electronic device as secured to an inside portion of a user's right wrist in accordance with yet another exemplary embodiment of the present invention.

Embodiments of the present invention can be more readily understood with reference to FIGS. 1-10, in which like reference numerals designate like items. FIGS. 1-4 illustrate one exemplary portable electronic device as possessed by differing limbs of a user. For example, FIG. 1 illustrates an exemplary wearable electronic device 101 as secured to an outside portion of a user's left arm 105 (in particular, the left wrist). FIG. 2 illustrates the exemplary wearable electronic device 101 as secured to an inside portion of the user's left wrist. FIG. 3 illustrates the exemplary wearable electronic device 101 as secured to an outside portion of the user's right arm 107 (in particular, the right wrist). Finally, FIG. 4 illustrates the exemplary wearable electronic device 101 secured to an inside portion of the user's right wrist. Though not illustrated in the drawings, one skilled in the art will readily recognize that the wearable electronic device 101 may be alternatively secured to other positions on the user's right or left arm (e.g., on the user's upper arm) or on the user's right or left leg, if so desired. The electronic device 101 may be secured to the user's limb 105, 107 using a strap 103, band, or any other desired securing mechanism. Alternatively, while FIGS. 1-4 illustrate a user's use of a wearable electronic device 101, the present invention is also applicable to and implementable within a handheld, portable electronic device or any other processor-based device that may be possessed by a limb of a user. As a result, the term "portable electronic device" as used herein and in the appended claims means any processor-based electronic device that may be possessed by (e.g., held by or secured to) a limb of a user. Additionally, the term "portable communication device" as used herein and in the appended claims means any portable electronic device with wireless communication capability.

Figure 5:
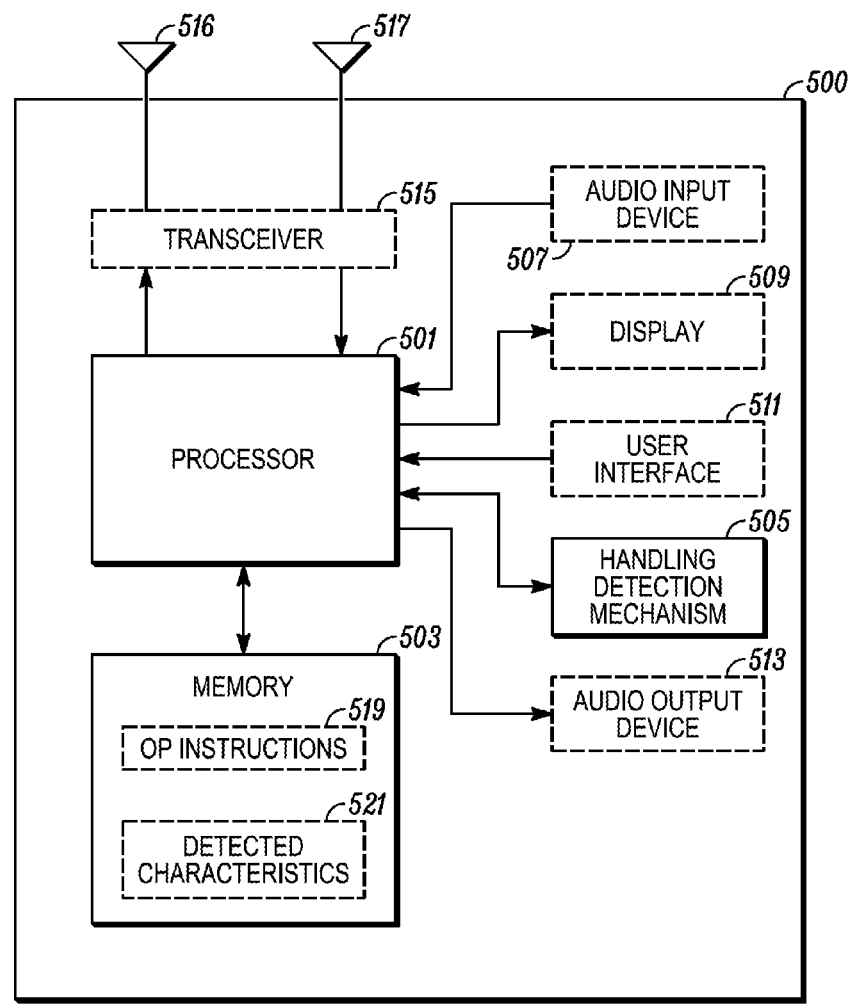
FIG. 5 is an electrical block diagram of an exemplary portable electronic device in accordance with one exemplary embodiment of the present invention.

FIG. 5 is an electrical block diagram of an exemplary portable electronic device 500 in accordance with one exemplary embodiment of the present invention. The exemplary electronic device 500 includes, inter alia, a processor 501, at least one storage device (e.g., memory 503), at least one detection mechanism 505 operable to detect characteristics relating to how a user handles the electronic device 500, and a direct current (DC) power source (not shown) that supplies electrical power to the various components of the electronic device 500. The electronic device 500 may also optionally include an audio input device 507 (e.g., a microphone and/or audio input jack), a display 509, a user interface 511, and/or an audio output device 513 (e.g., a speaker, a set of speakers, and/or an audio output jack). Where the electronic device 500 is a portable communication device, the electronic device 500 may further include one or more transceivers 515 (one shown) and one or more antennas 516, 517 (two shown). As illustrated, the processor 501 is operably coupled to the memory 503, the handling detection mechanism 505 and, when included, the audio input device 507, the display 509, the user interface 511, the audio output device 513, and the transceiver 515. The electronic device 500 may optionally include various other elements, including, but not limited to, an external memory interconnect to interface with a separate, transportable external memory device (e.g., a USB flash drive, a flash memory card, a subscriber identification module (SIM) card, or any other portable storage device).

The portable electronic device 500 may be any device or user equipment (UE) that is processor-based and possessable by a single limb of a user. Accordingly, the portable electronic device 500 may be, by way of example only, a smart phone, a cellular phone, a wristwatch phone, a tablet computer, a portable media player, a handheld or portable gaming device, a personal digital assistant, a camera, a camcorder, a handheld or wearable health monitoring device (such as, for example, a heart rate monitor), or a handheld GPS unit. A wristwatch-wearable version of the portable electronic device 500 of FIG. 5 may be used to implement the portable electronic device 101 illustrated in FIGS. 1-4.

The processor 501 may be a microprocessor, a microcontroller, a digital signal processor (DSP), a state machine, logic circuitry, or any other device or combination of devices that processes information based on operating or programming instructions 519 stored in the memory 503. One of ordinary skill in the art will appreciate that the processor 501 can be implemented using multiple processors as may be required to handle the processing requirements of the present invention and the various other included functions of the portable electronic device 500. One of ordinary skill in the art will further recognize that when the processor 501 has one or more of its functions performed by a state machine or logic circuitry, the memory containing the corresponding operational instructions can be embedded within the state machine or logic circuitry as opposed to being external to the processor 501, as is the electronic device's internal memory 503 as illustrated in FIG. 5. In one embodiment, the processor 501 controls substantially all the functionality of the portable electronic device 500.

The wireless device's internal memory 503 stores, inter alia, the operating instructions used by the processor 501 to control operation of the various components of the electronic device 500, including the operating instructions 519 necessary to perform the dexterity accommodation feature as described in more detail below with respect to FIGS. 6-10. The memory 503 may be separate from the processor 501 as depicted in FIG. 5 or integrated into the processor 501 as discussed above. The memory 503 can include random access memory (RAM), read-only memory (ROM), flash memory, electrically erasable programmable read-only memory (EEPROM), and/or various other forms of memory as are well known in the art. It will be appreciated by one of ordinary skill in the art that the various memory components can each be a group of separately located memory areas in the overall or aggregate device memory 503 and that the device memory 503 may include one or more individual memory elements.

The user handling detection mechanism 505 may include any device or combination of devices that are capable of detecting how a user handles the electronic device 500 while the device 500 is powered on. For example, the user handling detection mechanism 505 may include one or more devices that detect movement, direction, and/or rotation of the electronic device 500 and/or detect environmental characteristics surrounding the electronic device 500. Thus, the user handling detection mechanism 505 may include, for example, one or more cameras, an accelerometer, a gyroscope, and/or one or more proximity detectors (such as one or more optical sensors and/or ultrasonic sensors).

Where the user handling detection mechanism 505 includes a camera, the camera may be used to capture images representative of an environment in which the electronic device 500 resides while the electronic device 500 is at rest, in motion, and/or in use. For example, a camera of a wearable electronic device 101, 500 may capture images that show whether or not the camera is facing the user's body just prior to use or while at rest and thereby enable the processor 501 to determine whether the electronic device 500 is positioned on an inside or an outside of the user's limb (e.g., arm/wrist). The camera may also be able to capture images of the user's face or hand during use to aid the processor 501 in determining which limb of the user is in possession of the electronic device 500. For instance, the images captured by the camera may be digitally processed and compared to prestored images to enable the processor 501 to determine whether the electronic device 500 is approaching the user's head from the right side or the left side or whether the user's right hand or left hand is being used to interact with the device's user interface 511.

Where the user handling detection mechanism 505 includes an accelerometer, a gyroscope, or both, such device(s) may be used to detect motional characteristics, such as direction and/or angle of movement of the electronic device 500 relative to a reference position, to enable the processor 501 to determine which limb of the user possesses the electronic device 500. As discussed in more detail below, the reference position may be determined by the processor 501 by monitoring the normal activities of the user during initial setup of the electronic device 500 or by performing a training sequence in which the processor 501 executes a predetermined series of steps requiring one or more responses by the user through the user interface 511. When used, the accelerometer may be a solid state accelerometer and the gyroscope may be a solid state or microelectromechanical system (MEMS) gyroscope.

Where the user handling detection mechanism 505 includes one or more proximity detectors, such detector(s) may be used to enable the processor 501 to determine from which direction the electronic device's user interface 511 is accessed by a user's hand or a control instrument, such as a stylus. By knowing from which direction the user interface 511 is being accessed, the processor 501 can determine which limb is in possession of the electronic device 500. For example, a proximity detector may be installed on one side of the electronic device 500 and coupled to the processor 501. If the proximity detector detects the presence of an object shortly prior to an input received by the user interface 511, the processor 501 may determine that the electronic device 500 is currently possessed by the user's limb opposite the side of the device 500 that contains the proximity detector. For instance, if a proximity detector is placed on the right side of the electronic device 500 and detects an object just prior to receipt of a user interface input, the processor 501 may determine that the electronic device 500 is possessed by the user's left limb (e.g., hand, wrist, or arm). By contrast, if a proximity detector is placed on the right side of the electronic device 500 and does not detect an object just prior to receipt of a user interface input, the processor 501 may determine that the electronic device 500 is possessed by the user's right limb. Alternatively, multiple proximity detectors may be used and coupled to the processor 501 to enable the processor 501 to determine which limb possesses the electronic device 500 based on which proximity detector detects an object prior to receipt of a user input to the user interface 511.

When included, the audio input device 507 and the audio output device 513 may be conventional audio transducer devices, such as one or more microphones and one or more speakers. The audio input and output devices 507, 513 may include appropriate conventional drivers that are controllable by the processor 501 to directionally receive audio from a user and directionally output audio to the user according to control signals supplied by the processor 501.

The display 509 may be any conventional or future-developed display, such as a liquid crystal display (LCD), a plasma display, a light emitting diode (LED) display, an organic LED (OLED) display, or any other display technology. The display 509 includes appropriate conventional drivers and may optionally include graphics processors for illuminating various portions (e.g., pixels) of a display screen as instructed by the processor 501. The user interface 511 may be any conventional user interface or combination of conventional user interface components, such as rocker keys, buttons, a keypad, a keyboard, a scroll wheel, a thumbwheel, a touchpad, a touchscreen incorporated into a display screen of the display 509, or any other now known or future-developed user interface technology. The audio input device 507 and the audio output device 513 may be integrated with the user interface 511 where the processor 501 executes speech conversion/processing software to accept verbal commands and provide voice-synthesized responses.

When included, the transceiver 515 may comprise any conventional hardware and software for communicating control and user data, including voice communications, between the portable electronic device 500 and a base station or wireless access point providing communication service to the electronic device 500. Depending on the wireless protocol(s) chosen for the wireless system(s) in which the electronic device 500 can operate, the transceiver 515 may support one or more wireless communication protocols, such as Wi-Fi (e.g., IEEE 802.11 a/b/g/n), Bluetooth, Zigbee, WiMax (e.g., IEEE 802.16), Ultra Wide-Band (e.g., IEEE 802.15.4a draft standard), code division multiple access (CDMA), wideband CDMA, time division multiple access (TDMA), Global System for Mobile Communications (GSM), Enhanced Data GSM Environment (EDGE), General Packet Radio Service (GPRS), frequency division multiple access (FDMA), orthogonal frequency division multiplexing (OFDM), Evolution-Data Optimized (EVDO), High Speed Packet Access (HSPA), Evolved HSPA (HSPA+), Long Term Evolution (LTE), spread spectrum, or any other known or future developed access or link protocol or methodology. The transceiver 515 may include multiple receivers and transmitters when multiple link technologies are employed by the portable electronic device 500.

Additionally, where the transceiver 515 supports single input, multiple output (SIMO) and/or multiple input, multiple output (MIMO) functionality as contemplated by the HSPA and LTE protocols, the electronic device 500 may include two or more receive antennas 517. Alternatively or additionally, multiple receive antennas may be included where the transceiver 515 includes multiple receivers or a multi-mode receiver supporting reception of signals transmitted using different air interfaces (e.g., Wi-Fi, Bluetooth, and LTE or Wi-Fi, Bluetooth, WCDMA and GSM). Further, whereas the depicted electronic device 500 includes only a single transmit antenna 516, one or more additional transmit antennas may be used where the transceiver's transmitter supports MIMO functionality and/or the transceiver 515 includes multiple transmitters or a multi-mode transmitter supporting transmission of signals using different air interfaces.

Figure 6:
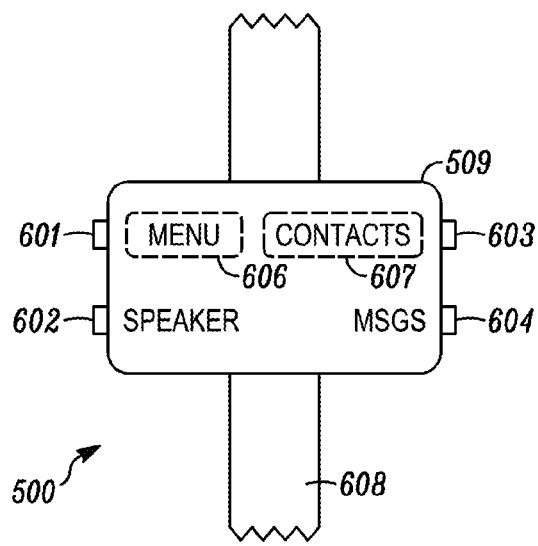
FIG. 6 illustrates an exemplary association of user interface buttons to device functions for a portable electronic device responsive to an automated determination that the electronic device is possessed by or secured to a left upper limb of a user in accordance with another exemplary embodiment of the present invention.
Figure 7:
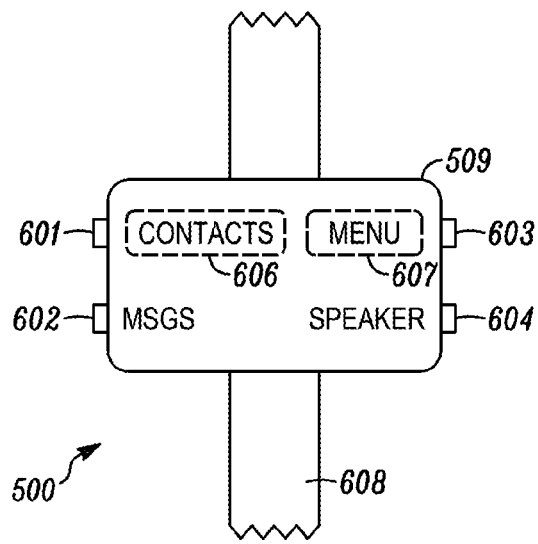
FIG. 7 illustrates an exemplary association of user interface buttons to device functions for a portable electronic device responsive to a determination that the electronic device is possessed by or secured to a right upper limb of a user in accordance with yet another exemplary embodiment of the present invention.
Figure 8:
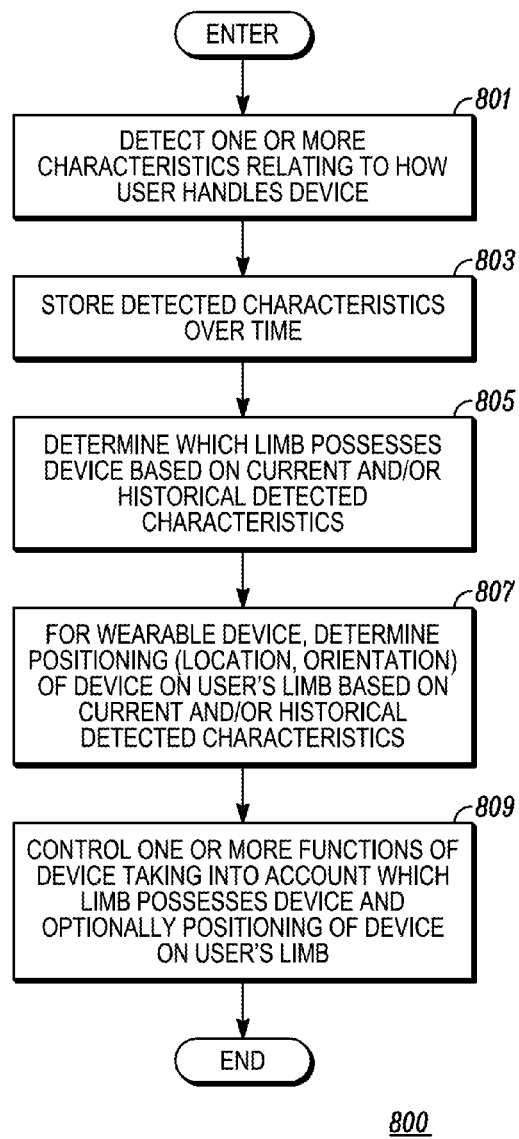
FIG. 8 is a logic flow diagram of steps executed by a portable electronic device to control operation of the electronic device taking into account which limb of a user possesses it, in accordance with a further exemplary embodiment of the present invention.

Operation of the portable electronic device 500 in accordance with exemplary embodiments of the present invention may be further understood with reference to FIGS. 6-10. Referring first to FIG. 8, a logic flow diagram 800 is depicted illustrating steps executed by a portable electronic device 500 to control operation of the device 500 in accordance with one exemplary embodiment of the present invention. The logic flow steps may be executed by various components of the portable electronic device 500, including, but not limited to, the processor 501, the memory 503, and the user handling detection mechanism 505. The steps executed by the device processor 501 are preferably performed in accordance with the operating instructions 519 (e.g., a computer program) stored in the device memory 503.

According to the embodiment of FIG. 8, when the electronic device 500 is powered on and the processor 501 is executing its operating instructions 519, the processor 501 instructs the user handling detection mechanism 505 to detect (801) one or more characteristics relating to how a user of the electronic device 500 handles the device 500. For example, where the user handling detection mechanism 505 includes a camera that faces away from a back side of the device 500 (e.g., the side opposite the side that includes the user interface 511), the processor 501 may instruct the camera to periodically turn on when the device 500 is at rest to capture one or more images of the device's external environment. Additionally, the processor 501 may instruct the camera to turn on when the processor 501 determines that the device 500 is in motion as detected by, for example, a compass, an accelerometer and/or a gyroscope, which may also form part of the user handling detection mechanism 505. By turning on the camera when motion is detected, the processor 501 can cause the camera to capture one or more images while the user is using or preparing to use the electronic device 500. Additionally or alternatively, the processor 501 may instruct the camera to turn on upon detecting an input at the user interface 511 so as to capture one or more images while the user is using the device 500. The captured images, as well as other detected characteristics as discussed in more detail below, may be stored (803) in memory 503 over a period of time to provide a set of historical detected characteristics 521, which may be used by the processor 501 to determine which limb of the user currently possesses the electronic device 500.

Where the user handling detection mechanism 505 includes an accelerometer and/or a gyroscope, the user handling detection mechanism 505 may be configured to detect direction, angle, rotation or other characteristics relating to motion of the electronic device 500. The detected motional characteristic may be represented by one or more signals (e.g., voltages) outputted by the applicable component (e.g., accelerometer or gyroscope) of the detection mechanism 505. In one embodiment, the motional characteristics detected by the detection mechanism 505 are detected relative to a reference position of the electronic device 500. The reference position may be any position and, in an exemplary embodiment, is a position of the electronic device 500 when at rest and possessed by a limb of the user.

The reference position may be determined in a variety of ways, including, for example, by analyzing positions of the electronic device 500 during use of the device 500 or as part of a training sequence performed by the user responsive to instructions provided by the device processor 501. For example, at initial power-up of the device 500 or when the user interface 511 is being accessed by the user, the processor 501 may determine the output voltages or other values of the accelerometer and/or gyroscope and use those values to define a reference position (e.g., the origin in a three-dimensional space) under an assumption that the electronic device 500 will be positioned directly in front of the user in a normal upright manner or be in some other expected position relative to the user's head at the time that the user turns on the device 500 for the first time or accesses the user interface 511. Alternatively, the reference position may be determined based on outputs of the user handling detection mechanism 505 when such outputs have not changed over a period of time after receipt of a user input to the user interface 511 or audio input device 507. Lack of movement of the device 500 after a user input may indicate that the user is maintaining the device in an "at rest" position, which can be used as the reference position. Determining the reference position as the "at rest" position allows the reference position to change over time as the user's "at rest" position changes during use of the device 500 by the user.

Alternatively, the processor 501 may execute a training sequence that instructs the user (e.g., visually via the display 509 and/or audibly via the audio output device 513) to respond to a series of questions using the user interface 511. For example, the processor 501 may display one or more textual messages, images or other information on the display 509, and ask the user whether the displayed information appears oriented in an upright manner. The processor 501 may also request user input via the user interface 511 in response to the question (e.g., selection of a "Yes" or "No" button). The processor 501 may also or alternatively instruct the user to move the electronic device 500 in a certain manner or to a certain location (e.g., directly in front of the user), and ask the user to provide a user input into the user interface 511 when the movement is completed. Responsive to the user inputs provided during the training sequence, the processor 501 may determine output values from the components of the user handling detection mechanism 505 (e.g., accelerometer and/or gyroscope outputs) and use the output values to define the reference position. Thus, the reference position may be determined by the processor 501 based on the user inputs received via the user interface 511 responsive to the displayed information and/or the requested movement of the electronic device 500.

After a reference position has been determined, the user handling detection mechanism 505 may detect user handling characteristics, such as motional characteristics, which can be compared to the reference position to aid in determining which limb of the user possesses the electronic device 500. For example, when the electronic device 500 includes an accelerometer as a component of the user handling detection mechanism 505, the processor 501 may use the three axis outputs of the accelerometer to determine how the electronic device 500 has been moved relative to the reference position. Movement detected from left-to-right and upward may be indicative of an electronic device possessed by a user's left limb; whereas, movement from right-to-left and upward may be indicative of an electronic device possessed by a user's right limb.

Figure 9:
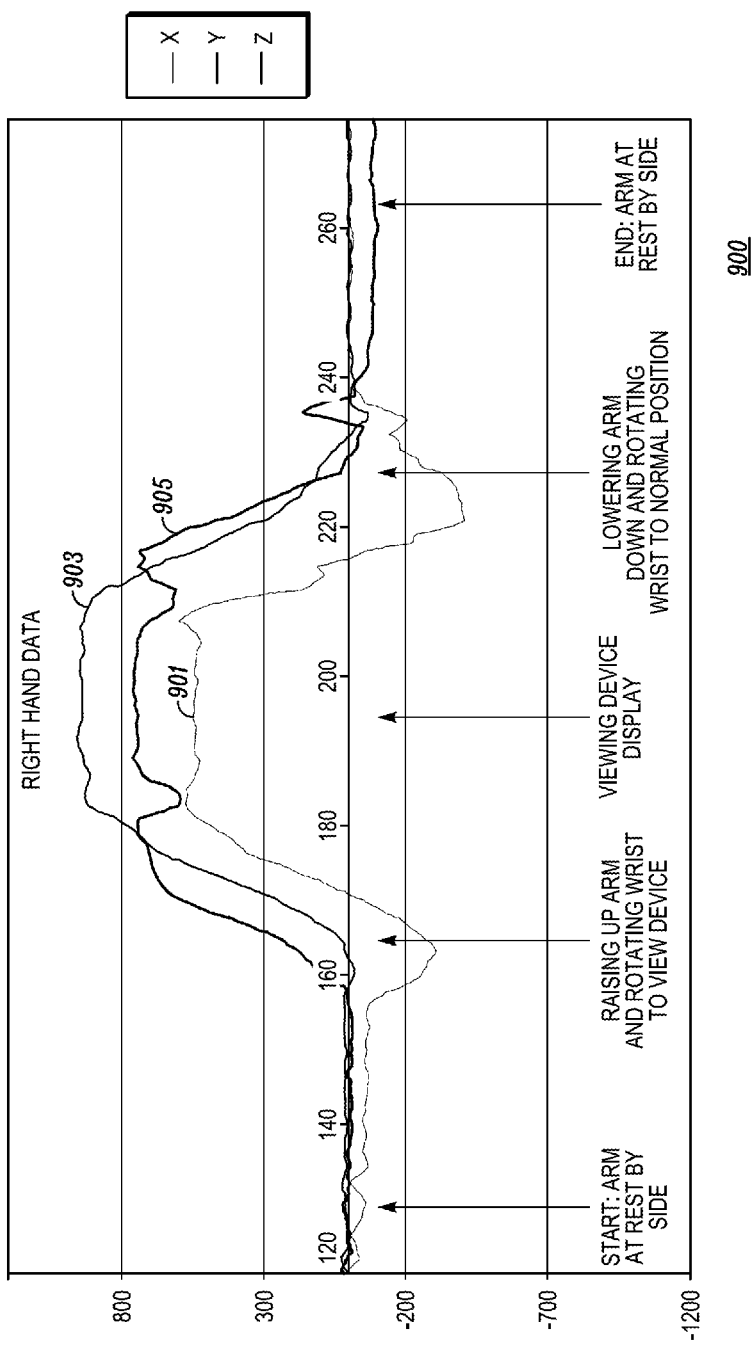
FIG. 9 illustrates exemplary accelerometer output voltage data over time for three axes when a portable electronic device incorporating the accelerometer and secured to a right wrist of a user is moved from a reference position to a viewing position and back to the reference position, in accordance an exemplary embodiment of the present invention.
Figure 10:
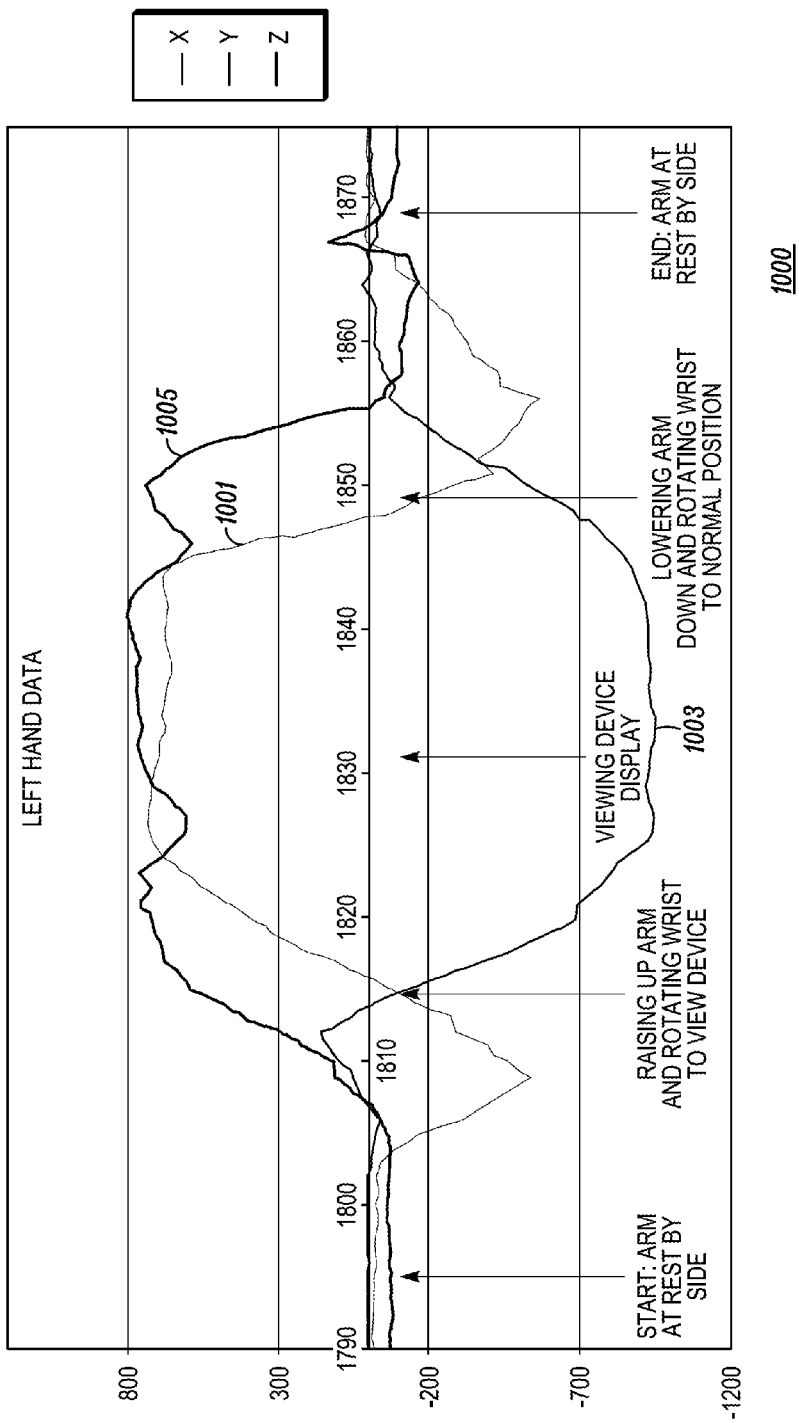
FIG. 10 illustrates exemplary accelerometer output voltage data over time for three axes when a portable electronic device incorporating the accelerometer and secured to a left wrist of a user is moved from a reference position to a viewing position and back to the reference position, in accordance with yet another exemplary embodiment of the present invention.

An exemplary use of accelerometer output data to show movement of a portable electronic device 500 relative to a reference position is provided in the accelerometer output voltage versus time graphs 900, 1000 shown in FIGS. 9 and 10. FIG. 9 illustrates accelerometer output voltage data when the electronic device 500 is secured to a right limb (e.g., wrist, hand, or arm) of a user standing upright and moved from a reference position to a viewing position and back to the reference position. FIG. 10 illustrates accelerometer output voltage data when the electronic device 500 is secured to a left limb of a user standing upright and moved from a reference position to a viewing position and back to the reference position. As shown in FIG. 9, when a reference position is established with the user's arm at rest facing downward on the right side of the user's body, moving the arm up and toward the user's body causes the accelerometer output voltages 901, 903, 905 associated with all three axes to be generally positive at the point in time when the user is viewing the device display 509. On the other hand, as shown in FIG. 10, when a reference position is established with the user's arm at rest facing downward on the left side of the user's body, moving the arm up and toward the user's body causes the accelerometer output voltages 1001, 1005 associated with the x-axis and the z-axis to be generally positive and the accelerometer output voltage 1003 associated with the y-axis to be generally negative at the point in time when the user is viewing the device display 509. Thus, the value of accelerometer output voltage along at least one of the axes (e.g., y-axis) may be used as an indicator of which limb currently possesses the electronic device 500. One skilled in the art will readily recognize and appreciate that the x, y, and z-axes referenced in the graphs 900, 1000 of FIGS. 9 and 10 generally represent three orthogonal axes defining a three-dimensional space centered at the reference position and are not intended to limit application of the present invention to any particular three-dimensional environment.

The characteristics detected by the various components of the user handling detection mechanism 505 may be stored (803) in memory 503 and used by the processor 501 at appropriate times to determine (805) which limb of the user possesses the device 500. For example, where the user handling detection mechanism 505 includes an accelerometer, a camera, and a proximity detector, the camera may capture images of the user's body and/or face, as well as other environmental images, over time as directed by the processor 501. Additionally, the accelerometer may detect movement of the electronic device 500 relative to a reference position and the proximity detector may detect a proximity of a side of the device 500 to an object, such as a hand. The detected characteristics may be collectively used by the processor 501 to determine which limb of the user possesses the electronic device 500. For example, the processor 501 may use a current set of accelerometer output voltages to estimate that the electronic device 500 is possessed by a user's right limb and then confirm such estimation by analyzing current and/or historical images captured by the camera. Additionally or alternatively, the processor 501 may confirm its estimation by analyzing current and/or historical outputs from the proximity detector to determine from which direction an object approached the device 500 just prior to receipt of one or more inputs to the user interface 511. Thus, if the accelerometer output voltages suggest that the electronic device 500 is currently possessed by the user's right limb, the historical proximity detector data stored in memory 503 indicates that an object regularly approaches the device 500 from the left side prior to receipt of a user interface input, and the camera captures images of the user or other objects indicative of possession by the user's right limb, the processor 501 may conclusively determine that the electronic device 500 is being possessed by the user's right limb. While the above example described one exemplary determination of which limb of a user possesses an electronic device 500 based on data detected by a user handling detection mechanism 505 that includes a camera, a proximity detector, and an accelerometer, those of ordinary skill in the art will readily recognize and appreciate that the user handling detection mechanism 505 may include fewer or more components as may be desired to detect characteristics relating to how a user is handling the device 500 taking into account the design constraints for the device 500, and the processor 501 may use the so-included component or components to determine which limb of the user possesses the device 500.

The current and historical user handling characteristics 521 may also be used by the device processor 501 to determine (807) a positioning of the electronic device 500 on a user's limb when the electronic device 500 is a wearable device, such as a wristwatch phone. For example, the detected user handling characteristics may be used to determine whether the electronic device 500 is positioned on an inside or an outside of the user's limb. Where the user handling detection mechanism 505 includes an accelerometer and camera as discussed in the above example, the current and historical data provided by such components may be further analyzed to determine the positioning of the device 500 on the user's limb. For example, where the camera captures images of the user's body when the device 500 is positioned at a reference position as detected by the accelerometer, the processor 501 may determine that the device 500 is positioned on an inside of the user's wrist or arm. Alternatively, where the camera does not capture images of the user's body when the device 500 is positioned at a reference position as detected by the accelerometer, the processor 501 may determine that the device 500 is positioned on an outside of the user's wrist or arm. Still further, where the user handling detection mechanism 505 includes a gyroscope, detected rotation of the device 500 in combination with device movement may be used to determine positioning of the device 500 on the user's limb. For example, where the accelerometer output indicates movement of the device 500 toward the user's head and the gyroscope output indicates clockwise rotation of the device 500, the processor 501 may determine that the device 500 is positioned on an inside of the user's wrist or arm. By contrast, where the accelerometer output indicates movement of the device 500 toward the user's head and the gyroscope output indicates counterclockwise rotation of the device 500, the processor 501 may determine that the device 500 is positioned on an outside of the user's wrist or arm.

Still further, the current and historical user handling characteristics 521 may be used by the device processor 501 to determine an expected location of the user's head relative to the device 500. For example, where the user handling detection mechanism 505 includes an accelerometer, the accelerometer outputs together with a user input or sequences of user inputs received via the user interface 511 may provide a set of characteristics or parameters from which the processor 501 may determine the expected location of the user's head during use of the electronic device 500 by the user. As described above, the accelerometer outputs may be used to determine whether movement of the device 500 along three axes is in positive or negative directions relative to a reference position. Thus, when accelerometer outputs indicate that the electronic device 500 has been moved toward the user's body, the outputs may also be used to estimate the direction/location of the user's head, especially where the device movement is immediately followed by receipt of inputs from the user interface 511. For instance, when a reference position for the electronic device 500 has been established with the user standing or sitting upright and the electronic device 500 possessed by the user's right hand, wrist or arm, generally positive output voltages for all three axes as illustrated in FIG. 9 may indicate movement of the electronic device 500 toward the user's body and head, with the processor 501 being able to assume that the user's head will be positioned directly over or slightly below the user interface 511.

If the user then lies down (e.g., on a sofa, chair or bed), movement of the electronic device 500 toward the user's head will produce different accelerometer output voltages unless a new reference position is established with the user lying down. However, if so desired, the user's change of position (sitting upright to lying down) may be accounted for by other components of the user handling detection mechanism 505 when the detection mechanism 505 includes such components. For example, when the user handling detection mechanism 505 includes a gyroscope, rotation of the device 500 as detected by the gyroscope may also be considered by the processor 501 to determine the expected location of the user's head. In such a case, the processor 501 may evaluate current and historical axial motion as detected by the accelerometer and current and historical rotational motion as detected by the gyroscope to estimate the expected location of the user's head. For instance, where a reference position is established with the user sitting or standing upright, the processor 501 may determine that positive axial motion in combination with clockwise rotational movement is historically followed by user speech received by the audio input device 507 or user input received by the user interface 511. Such may be the case for a user holding a portable communication device, such as a smart phone or cellular phone. When the user then decides to lay on his or her side, or even upside down, the axial references may change, but the rotational reference will not. As a result, detection of axial movement in combination with clockwise rotational movement may be used by the processor 501 to determine that the user's head will be generally in the direction of the clockwise rotational movement. Where the user handling detection mechanism 505 further includes a camera that is ordinarily positioned toward the user when the user interface 511 is receiving user inputs, the processor 501 may instruct the camera to capture one or more images to enable the processor 501 to confirm or reject its determination of the user's head location.

After determining which limb of the user possesses the electronic device 500 and optionally determining a positioning of the electronic device 500 on the limb of the user (e.g., for a wearable electronic device 500), the device processor 501 controls (809) one or more functions of the electronic device 500 taking into account which limb of the user possesses the device 500 and optionally how the device 500 is positioned on the user's limb. The functions which may be controlled include any functions that may benefit from knowledge of which limb possesses the device 500 or any functions that may be changed to provide a better user experience in view of which limb possesses the device 500. Exemplary functions that may be controlled taking into account which limb possesses the device 500 include a direction of audio outputted by the audio output device 513 (audio output steering), a direction from which audio is received by the audio input device 507 (audio input or microphone steering), arrangement of information displayed on the display 509, and a configuration of the user interface 511, just to name a few.

With respect to controlling audio output, the processor 501 may control a direction of audio outputted by the audio output device 513 so as to improve the audio volume and quality perceived by a user taking into account which limb of the user possesses the electronic device 500 and/or the expected location of the user's head, both of which may have been determined as detailed above. For example, when the processor 501 determines that the electronic device 500 is possessed by the user's right arm, wrist or hand, the processor 501 may control the audio output device 513 to output audio in a leftward and upward direction so as to be directed to the expected location of the user's head relative to the device's placement on the user's right limb. On the other hand, when the processor 501 determines that the electronic device 500 is possessed by the user's left arm, wrist or hand, the processor 501 may control the audio output device 513 to output audio in a rightward and upward direction so as to be directed to the expected location of the user's head relative to the device's placement on the user's left limb.

With respect to controlling audio input, the processor 501 may control the audio input device 507 so as to directionally detect audio from the user taking into account which limb of the user possesses the electronic device 500 and/or the expected location of the user's head. For example, when the processor 501 determines that the electronic device 500 is possessed by the user's right arm, wrist or hand, the processor 501 may control the audio input device 507 to increase its sensitivity in a leftward and upward direction so as to detect audio from the expected location of the user's head relative to the device's placement on the user's right limb. On the other hand, when the processor 501 determines that the electronic device 500 is possessed by the user's left arm, wrist or hand, the processor 501 may control the audio input device 507 to increase its sensitivity in a rightward and upward direction so as to detect audio from the expected location of the user's head relative to the device's placement on the user's left limb.

With respect to arrangement of displayed information, the processor 501 may control the display 509 to arrange displayed information taking into account which limb of the user possesses the electronic device 500. For example, when the processor 501 determines that the electronic device 500 is possessed by the user's right arm, wrist or hand, the processor 501 may control the display 509 to position more important information on the left side of the display 509 or in the left center portion of the display to make the information more readily viewable by the user. On the other hand, when the processor 501 determines that the electronic device 500 is possessed by the user's left arm, wrist or hand, the processor 501 may control the display 509 to position more important information on the right side of the display 509 or in the right center portion of the display to make the information more readily viewable by the user.

In an alternative embodiment in which the processor 501 determines an expected location of the user's head based on user handling characteristics detected by the user handling detection mechanism 505, the processor 501 may additionally or alternatively control the display 509 to orient displayed information upright relative to an expected location of the user's head. By analyzing current and historical detected user handling characteristics 521, the processor 501 may, as discussed above, effectively determine whether the user is currently sitting or standing upright, lying sideways, or lying upside down and present the displayed information so that it appears properly oriented for viewing by the user regardless of the user's physical orientation.

With respect to user interface configuration, the processor 501 may control configuration of the user interface 511 taking into account which limb of the user possesses the electronic device 500. For example, when the processor 501 determines that the electronic device 500 is possessed by the user's right arm, wrist or hand, the processor 501 may configure the user interface 511 such that the buttons (electronic or mechanical) or other user interface components of the device which are most easily accessible by another limb of the user (e.g., the user's free left hand) control user interface functions of the device 500 considered by the device manufacturer or device user to be primary or most important. On the other hand, when the processor 501 determines that the electronic device 500 is possessed by the user's left arm, wrist or hand, the processor 501 may configure the user interface 511 such that the user interface components of the device which are most easily accessible by the user's free right hand control the primary user interface functions of the device 500. In other words, upon determining which limb possesses the electronic device 500, the processor 501 may configure the user interface functions to make the most used functions readily accessible to the user's free hand instead of leaving them in a default mode that may be less convenient for the user.

An exemplary illustration of how the processor 501 may control display and user interface functionality of the portable electronic device 500 taking into account which limb of the user possesses the device 500 is provided in FIGS. 6 and 7. As illustrated in FIG. 6, electromechanical buttons 601-604 of the device 500 may be associated with a set of user interface functions. Alternatively, where the user interface 511 includes a touchscreen interface accessible through the device display 509, electronic or "soft" function buttons (such as electronic buttons 606 and 607) may be associated with certain user interface functions. Where the electronic device 500 is wearable on the user's limb, the device 500 may further include a strap 608 or other mechanism for securing the device 500 to the user's limb.

The button-function association illustrated in FIG. 6 may be a default association or may be an association resulting from processor instruction responsive to the processor's determination that the electronic device 500 is possessed by the user's upper left limb (e.g., arm, wrist or hand). To illustrate how the button-function association may be based on possession of the electronic device 500 by the user's right hand, it is assumed that the original default button-function association is the button-function association as illustrated in FIG. 7 or any button-function association other than the association shown in FIG. 6. Additionally, it is assumed that the "CONTACTS" function and "MSGS" (i.e., "Messages") function are the primary user interface functions for the electronic device 500, which may be the case where the electronic device 500 is a portable communication device. Based on the foregoing assumptions, responsive to the electronic device processor 501 determining that the electronic device 500 is currently being possessed by the user's left hand, wrist or arm, the processor 501 may automatically reconfigure the button-function association to be as shown in FIG. 6 so that the primary user interface functions are configured on the right side of the device 500 and, therefore, more readily accessible by the user's free limb. Additionally, where the buttons 606, 607 are electronic or the button-function associations are displayed on the display 509, the processor 501 may control the display 509 so as to arrange the displayed function identifiers (e.g., "CONTACTS", "MSGS", "MENU", and "SPEAKER" (shorthand for speakerphone), in this example) to mirror the user interface configuration. The change of displayed function identifiers is one simple example of how the arrangement of displayed information may be modified taking into account which limb of the user possesses the electronic device 500.

If possession of the electronic device 500 illustrated in FIG. 6 is changed from the user's left hand to, for example, the user's right hand, the processor 501 may control the user interface 511 to reconfigure its button-function associations to those shown in FIG. 7. In this case, responsive to the processor's determination of the change in possession as detailed above, the processor 501 may automatically reconfigure the button-function association so that the primary user interface functions are configured on the left side of the device 500 and, therefore, more readily accessible by the user's free hand. Additionally, where the buttons 606, 607 are electronic or the button-function associations are displayed on the display 509, the processor 501 may control the display 509 so as to arrange the displayed function identifiers to mirror the user interface configuration. While illustrative examples have been presented for reconfiguring a user interface 511 of the electronic device 500 and arranging displayed information on a display 509 of the electronic device 500 taking into account which limb of the user possesses the electronic device 500, one skilled in the art will readily recognize and appreciate that the presented illustrations are merely exemplary in nature and are not intended to limit the scope of the present invention or the appended claims.

As noted above, the portable electronic device 500 may be a portable communication device when the device 500 includes, among other things, one or more wireless transceivers 515. In such a case, the transceiver 515 functions to transmit and receive wireless communication signals that may include, for example, audio information, video information, graphics, and/or textual data. Where a received wireless communication signal includes audio information to be provided to the portable communication device user (e.g., as part of a telephone call in which the portable communication device user is participating), the processor 501 may process the received wireless communication signal in accordance with conventional techniques to extract the audio information from the received signal and then control the audio output device 513 to output the audio information toward an expected head location of the user (e.g., perform audio steering) taking into account which limb of the user possesses the portable communication device and/or a positioning of the portable communication device on the limb of the user. In other words, the processor 501 of the portable communication device may use the processes disclosed above to determine which limb of the user is in possession of the portable communication device and/or a positioning of the portable communication device on the user's limb (e.g., where the portable communication device is wearable or otherwise securable to the user). Responsive to such determination, the processor 501 may control the audio output device 513 to directionally output or steer the audio information in the received communication signal toward the expected location of the user's head taking into account which limb of the user is in possession of the portable communication device.

Besides controlling audio information output by the audio output device 513 responsive to determining which limb of the user is in possession of the portable communication device, the processor 501 of the portable communication device may control the audio input device 507 to detect audio from the expected location of the user's head taking into account which limb of the user possesses the portable communication device. In other words, the portable communication device processor 501 may use knowledge of which limb possesses the device to effectively steer a microphone or other audio input device 507 toward the user's head so as to more easily receive the user's spoken audio during, for example, a telephone call in which the user is participating. Additionally, the portable communication device processor 501 may control the device's display 509 and/or user interface 511 in the manners discussed above to respectively arrange displayed information and configure the user interface 511 taking into account which limb of the user the processor 501 has determined is in possession of the device and/or how the device is positioned on the user's limb.

The present invention encompasses a portable electronic device and associated methods for controlling operation of the device taking into account which limb of the user possesses the device. With this invention, an electronic device may automatically adapt one or more of its functions to accommodate use of the device when the device is being held or worn by the user. In this manner, the present invention provides a dexterity accommodation feature for the electronic device, thereby enhancing the device's user experience.

As detailed above, embodiments of the present invention reside primarily in combinations of method steps and/or apparatus components related to controlling operation of a portable electronic device taking into account which limb of a user possesses the electronic device. Accordingly, the apparatus components and method steps have been represented, where appropriate, by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as "first" and "second," "top" and "bottom," and the like may be used solely to distinguish one entity or action from another entity or action without necessarily requiring or implying any actual relationship or order between such entities or actions. The terms "comprises," "comprising," "includes," "including," "has," "having," "contains," "containing," and any other variations thereof are intended to cover a non-exclusive inclusion, such that a process, method, article, or apparatus that comprises, includes, has, or contains a list of elements does not include only those elements but may include other elements not expressly listed or inherent to such process, method, article, or apparatus. The term "plurality of" as used in connection with any object or action means two or more of such object or action. A claim element proceeded by the article "a" or "an" does not, without more constraints, preclude the existence of additional identical elements in the process, method, article, or apparatus that includes the element.

It will be appreciated that embodiments of the portable electronic device 101, 500 described herein may be comprised of one or more conventional processors and unique stored program instructions that control the processor(s) to implement, in conjunction with certain non-processor circuits, some, most, or all of the functions of the portable electronic device 101, 500 and its operational methods as described herein. The non-processor circuits may include, but are not limited to, storage devices (such as the internal memory 503), the user handling detection mechanism 505, the audio input device 507, the display 509, the user interface 511, the audio output device 513, and the transceiver 515 described above, as well as filters, clock circuits, and various other non-processor circuits. As such, the functions of these non-processor circuits may be interpreted as steps of a method for controlling operation of a portable electronic device. Alternatively, some or all functions could be implemented by a state machine that has no stored program instructions, or in one or more application specific integrated circuits (ASICs), in which each function or some combinations of certain of the functions are implemented as custom logic. Of course, a combination of the various approaches could be used. Thus, methods and means for these functions have been generally described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions or programs and integrated circuits without undue experimentation.

In the foregoing specification, specific embodiments of the present invention have been described. However, one of ordinary skill in the art will appreciate that various modifications and changes can be made without departing from the scope of the present invention as set forth in the appended claims. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as critical, required, or essential features or elements of any or all the claims. The invention is defined solely by the appended claims including any amendments made during the pendency of this application and all equivalents of those claims as issued.

We claim:

1. A portable electronic device comprising:
   a detection mechanism operable to detect one or more characteristics relating to how a user handles the portable electronic device; and
   a processor operably coupled to the detection mechanism and operable in accordance with stored operating instructions to:
      determine a reference position from one or more positions of the portable electronic device, wherein the portable electronic device in the reference position is at rest and possessed by at least one limb of the user;
      determine, based on a comparison of the reference position to at least one of the one or more characteristics detected by the detection mechanism based on an updated position of the portable electronic device that is different than the reference position, a particular limb of the user that possesses the portable electronic device;
      responsive to determining the particular limb of the user that possesses the portable electronic device, determine, based on the at least one of the one or more characteristics, a positioning of the portable electronic device on the particular limb of the user that possesses the portable electronic device, wherein the positioning comprises at least one of a location or an orientation of the portable electronic device on the particular limb; and
      control, based on the particular limb of the user that possesses the portable electronic device and further based on the positioning of the portable electronic device on the particular limb, at least one function of the portable electronic device.

2. The portable electronic device of claim 1, wherein the detection mechanism includes at least one of a camera, an optical sensor, an ultrasonic sensor, an accelerometer, or a gyroscope.

3. The portable electronic device of claim 1, further comprising:
   a display operably coupled to the processor; and
   a user interface operably coupled to the processor,
   wherein the processor is further operable to:
      output, for display, at least one of textual messages or images; and
      after outputting the at least one of the textual messages or the images, determine the reference position for the portable electronic device further based on inputs received via the user interface.

4. The portable electronic device of claim 1, further comprising:
   an audio output device coupled to the processor,
   wherein the at least one function of the portable electronic device controlled by the processor includes a direction of audio outputted by the audio output device, and
   wherein the processor is further operable to control the audio output device to output the audio toward an expected head location of the user based on the particular limb of the user that possesses the portable electronic device.

5. The portable electronic device of claim 1, further comprising:
   an audio input device coupled to the processor,
   wherein the at least one function of the portable electronic device controlled by the processor includes a direction from which audio is received by the audio input device, and
   wherein the processor is further operable to control the audio input device to detect audio from an expected head location of the user based on the particular limb of the user that possesses the portable electronic device.

6. The portable electronic device of claim 1, further comprising:
   a display coupled to the processor,
   wherein the at least one function of the portable electronic device controlled by the processor includes arrangement of information displayed on the display, and
   wherein the processor is further operable to control the display to arrange the displayed information based on the particular limb of the user that possesses the portable electronic device.

7. The portable electronic device of claim 1, further comprising:
   a user interface coupled to the processor,
   wherein the at least one function of the portable electronic device controlled by the processor includes a configuration of the user interface, and
   wherein the processor is further operable to control the configuration of the user interface based on the particular limb of the user that possesses the portable electronic device.

8. The portable electronic device of claim 1, wherein the processor operable to determine the reference position for the portable electronic device is further operable to:
  determine the reference position further based on at least one of:
    an activation, at the portable electronic device, of a limb detection feature that determines the particular limb of the user that possesses the portable electronic device, or
    general use of the portable electronic device by the user that is not part of an initial start-up of the portable electronic device.

9. The portable electronic device of claim 1, wherein the processor operable to determine the reference position for the portable electronic device is further operable to:
  determine, in response to receiving at least one user input, and based on at least one output of the detection mechanism, at least one of:
    an orientation of the portable electronic device when the at least one user input was received, or
    a position of the portable electronic device relative to a user of the portable electronic device when the at least one user input was received; and
  determine the reference position for the portable electronic device further based on at least one of the orientation of the portable electronic device or the position of the portable electronic device relative to the user of the portable electronic device.

10. The portable electronic device of claim 1, wherein the processor is further operable to:
  determine whether detected movement along at least one of three axes in a three-dimensional space is in a positive direction or a negative direction relative to the reference position, the detected movement corresponding to the one or more characteristics, and
  wherein the processor operable to determine which limb of the user possesses the portable electronic device is further operable to determine the particular limb of the user that possesses the portable electronic device based on whether the detected movement along the at least one of the three axes in the three-dimensional space is in the positive direction or the negative direction relative to the reference position.

11. The portable electronic device of claim 1, further comprising:
  a memory operable to store detected characteristics of a previous use of the portable electronic device by the user over a period of time to produce historical characteristics that indicate which limb of a plurality of limbs of the user previously possessed the portable electronic device, and
  wherein the processor, operable in accordance with stored operating instructions to determine the particular limb of the user that possesses the portable electronic device, is further operable to determine, based on the historical characteristics, the particular limb of the user that possesses the portable electronic device.

12. A method comprising:
  detecting, by a portable electronic device, one or more characteristics relating to how a user handles the portable electronic device;
  determining a reference position from one or more positions of the portable electronic device, wherein the portable electronic device in the reference position is at rest and possessed by at least one limb of the user;
  determining, by the portable electronic device based on a comparison of the reference position to at least one of the one or more characteristics detected by the portable electronic device based on an updated position of the portable electronic device that is different than the reference position, a particular limb of the user that possesses the portable electronic device;
  responsive to determining the particular limb of the user that possesses the portable electronic device, determining, based on the at least one of the one or more characteristics, a positioning of the portable electronic device on the particular limb of the user that possesses the portable electronic device, wherein the positioning comprises at least one of a location or an orientation of the portable electronic device on the particular limb; and
  controlling, by the portable electronic device, based on the particular limb of the user that possesses the portable electronic device and further based on the positioning of the portable electronic device on the particular limb, at least one function of the portable electronic device.

13. The method of claim 12, further comprising:
  storing the one or more characteristics over a period of time to produce historical characteristics,
  wherein determining the particular limb of the user that possesses the portable electronic device is based on the historical characteristics.

14. The method of claim 12, wherein determining the reference position for the portable electronic device further comprises:
  outputting, by the portable electronic device and for display, at least one of textual messages or images;
  after outputting the at least one of the textual messages or the images, receiving, by the portable electronic device, inputs from the user; and
  determining the reference position for the portable electronic device further based on the inputs received from the user.

* * * * *